(12) United States Patent
Kim et al.

(10) Patent No.: US 11,897,072 B2
(45) Date of Patent: Feb. 13, 2024

(54) APPARATUS FOR OPERATING MAIN SHAFT OF MACHINE TOOL

(71) Applicant: DN SOLUTIONS CO., LTD., Changwon-si (KR)

(72) Inventors: Youngmin Kim, Changwon-si (KR); Jingeun Woo, Changwon-si (KR)

(73) Assignee: DN SOLUTIONS CO., LTD., Changwon-si (KR)

( * ) Notice: Subject to any disclaimer, the term of this patent is extended or adjusted under 35 U.S.C. 154(b) by 925 days.

(21) Appl. No.: 16/769,431

(22) PCT Filed: Nov. 22, 2018

(86) PCT No.: PCT/KR2018/014403
§ 371 (c)(1),
(2) Date: Jun. 3, 2020

(87) PCT Pub. No.: WO2019/124771
PCT Pub. Date: Jun. 27, 2019

(65) Prior Publication Data
US 2020/0368864 A1    Nov. 26, 2020

(30) Foreign Application Priority Data

Dec. 22, 2017    (KR) .................... 10-2017-0177747

(51) Int. Cl.
*B23Q 5/04* (2006.01)
*B23Q 5/56* (2006.01)
*F16H 1/20* (2006.01)

(52) U.S. Cl.
CPC .............. *B23Q 5/043* (2013.01); *F16H 1/20* (2013.01); *B23Q 5/56* (2013.01); *B23Q 2705/06* (2013.01)

(58) Field of Classification Search
CPC ...... B23Q 5/043; B23Q 5/26; B23Q 2705/06; F16H 1/20
(Continued)

(56) References Cited

U.S. PATENT DOCUMENTS

| 5,329,828 A * | 7/1994 | Hurth ...................... F16H 3/006 74/661 |
| 5,388,450 A * | 2/1995 | Hurth .................... F16H 61/444 74/331 |
| 11,685,247 B2 * | 6/2023 | Bergström .............. F16H 3/725 475/149 |

FOREIGN PATENT DOCUMENTS

| CN | 102001013 A | 4/2011 |
| JP | 11090756 A | 4/1999 |

(Continued)

OTHER PUBLICATIONS

International Search Report of PCT/KR2018/014403, dated Mar. 5, 2019, English translation.

*Primary Examiner* — Ha Dinh Ho
(74) *Attorney, Agent, or Firm* — STIP Law Group, LLC

(57) ABSTRACT

The present disclosure relates to an apparatus for operating a main shaft of a machine tool, the apparatus including: an input unit configured to transmit power for operating the main shaft; an output unit disposed in parallel with the input unit and configured to operate the main shaft with the power from the input unit; and a transmission unit disposed in parallel with the input unit and the output unit so as to be capable of rectilinearly reciprocating between the input unit and the output unit and configured to transmit the power from the input unit to the output unit, wherein the main shaft is capable of operating in a high-speed mode, a low-speed mode, or a C-axis mode in accordance with the rectilinear reciprocation of the transmission unit.

18 Claims, 10 Drawing Sheets

(58) Field of Classification Search
USPC .................................................. 74/325, 342
See application file for complete search history.

(56) References Cited

FOREIGN PATENT DOCUMENTS

| | | | |
|---|---|---|---|
| JP | 5311253 | B2 | 10/2013 |
| JP | 5741909 | B2 | 7/2015 |
| JP | 2016182663 | A | 10/2016 |
| KR | 100824522 | B1 | 4/2008 |
| KR | 1020120015738 | A | 2/2012 |
| KR | 1020130061933 | A | 6/2013 |
| KR | 101401204 | B1 | 5/2014 |
| KR | 101438230 | B1 | 9/2014 |
| KR | 101506741 | B1 | 3/2015 |
| KR | 101514075 | | 4/2015 |
| KR | 1020170114708 | A | 10/2017 |

\* cited by examiner

[Fig. 1]
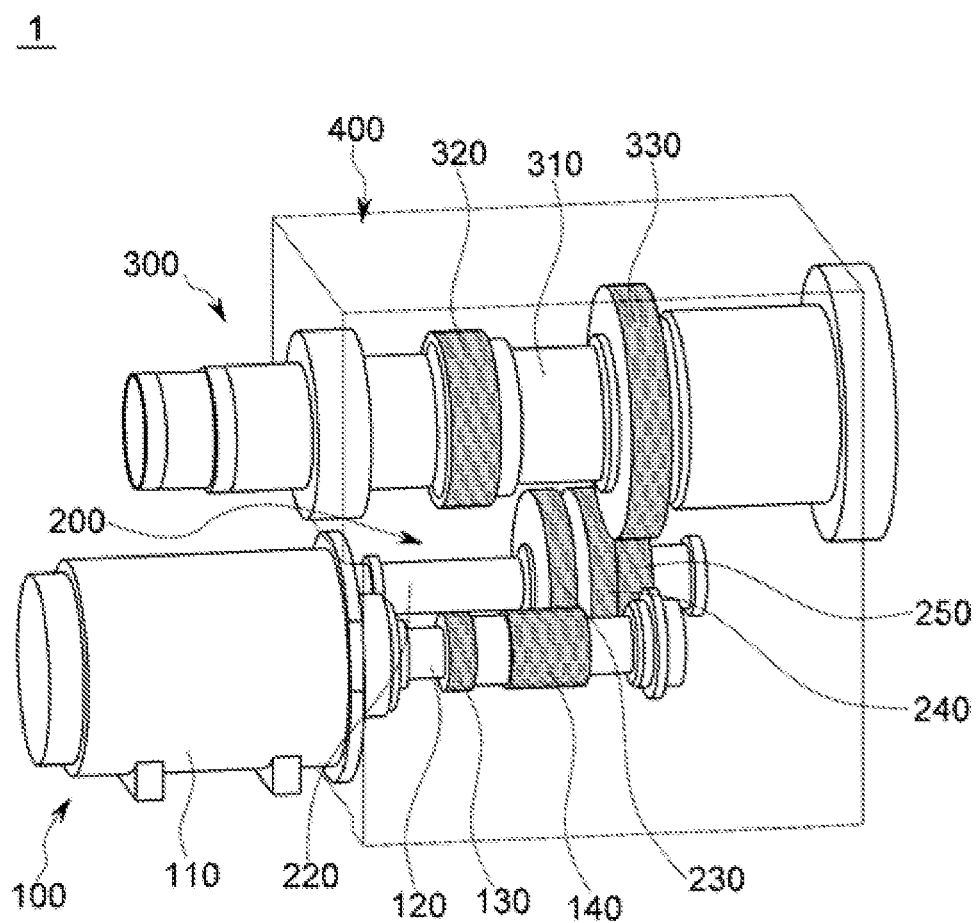

[Fig. 2]
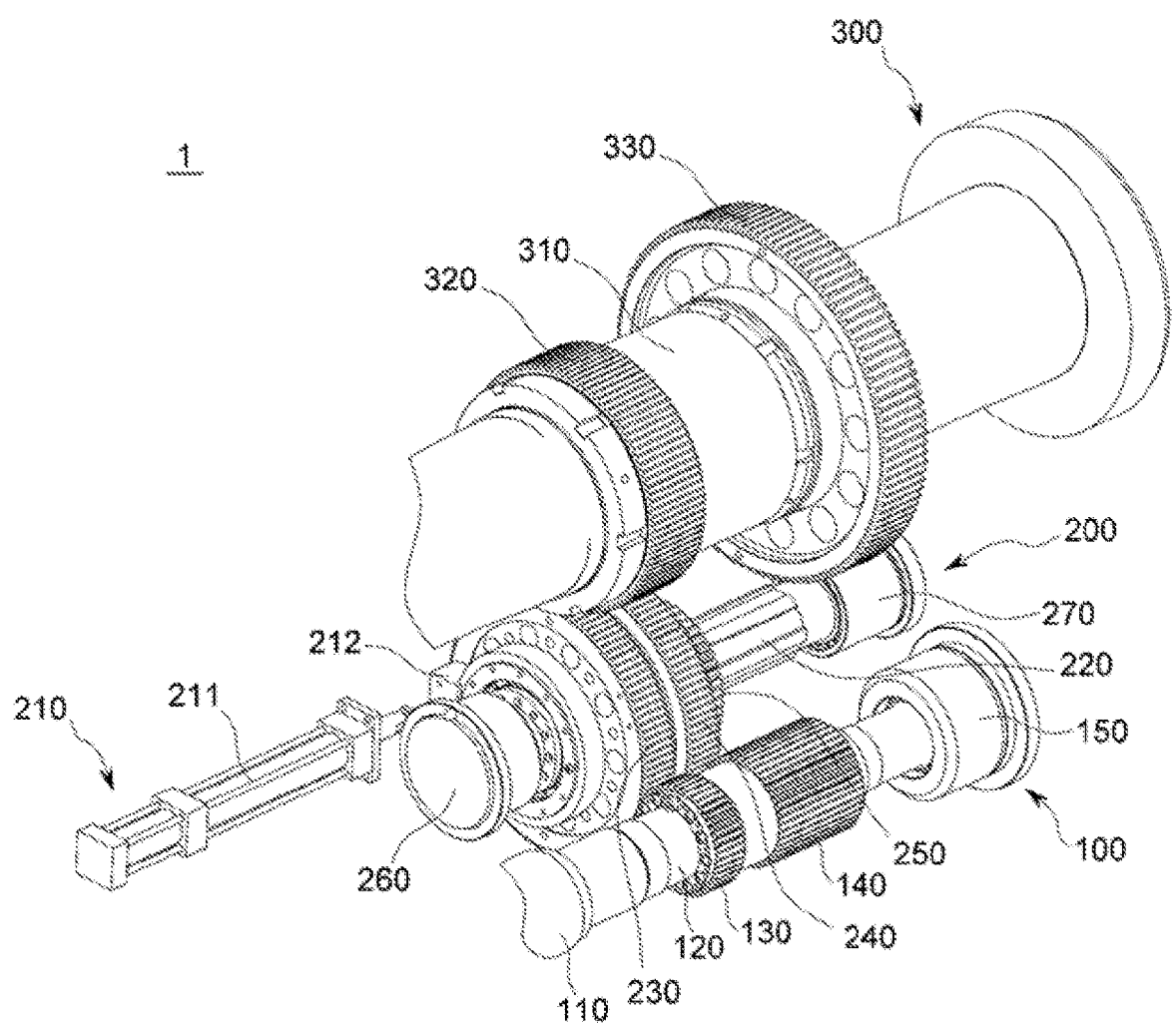

[Fig. 3]
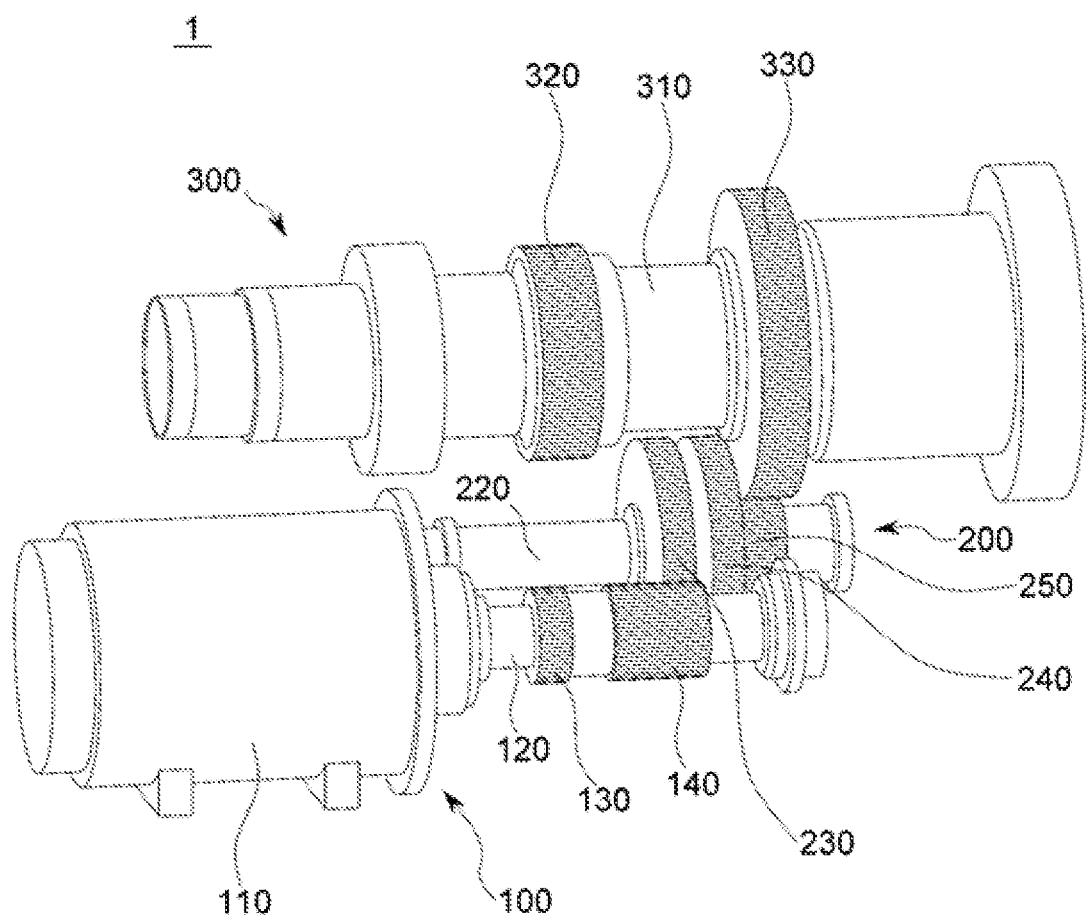

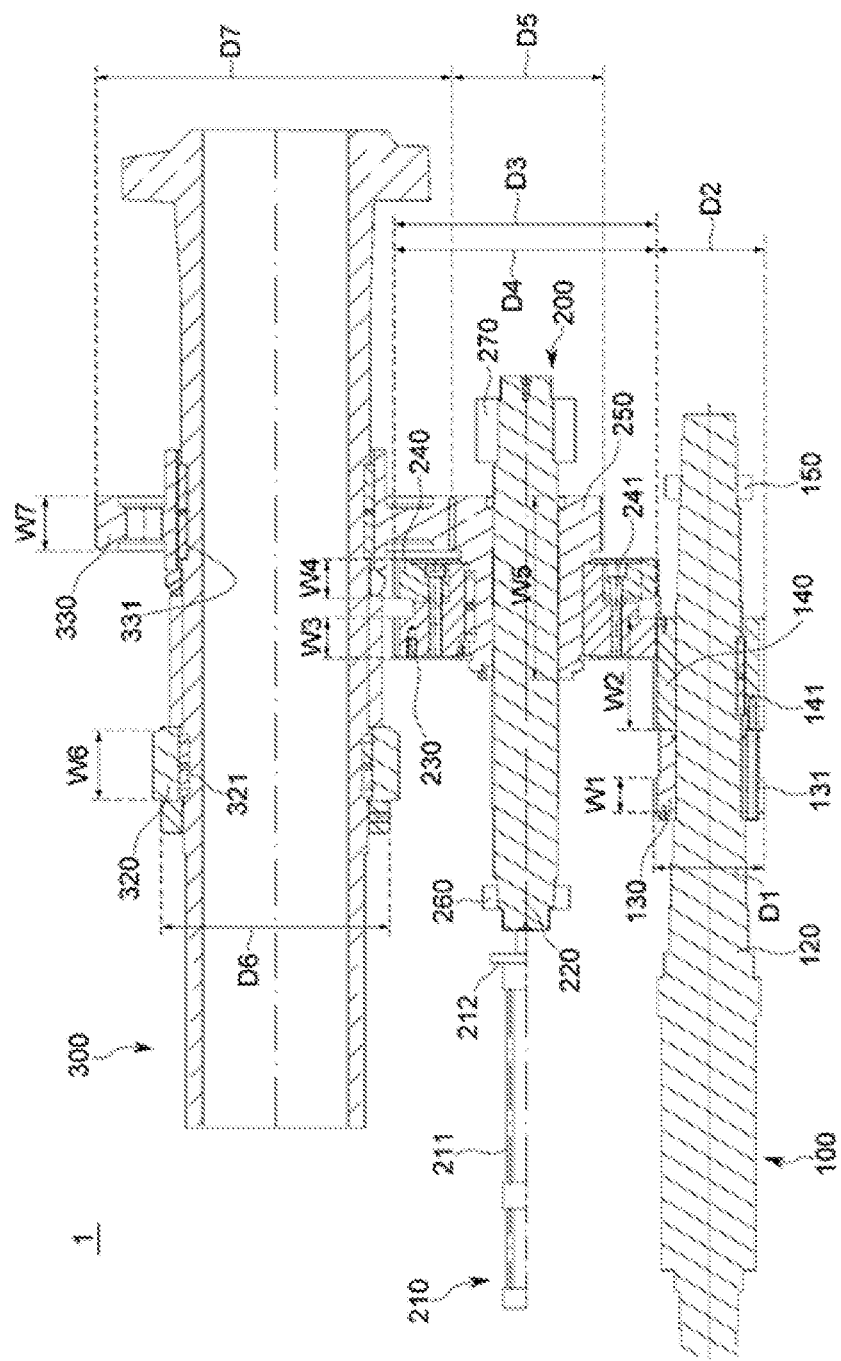
[Fig. 4]

[Fig. 5]
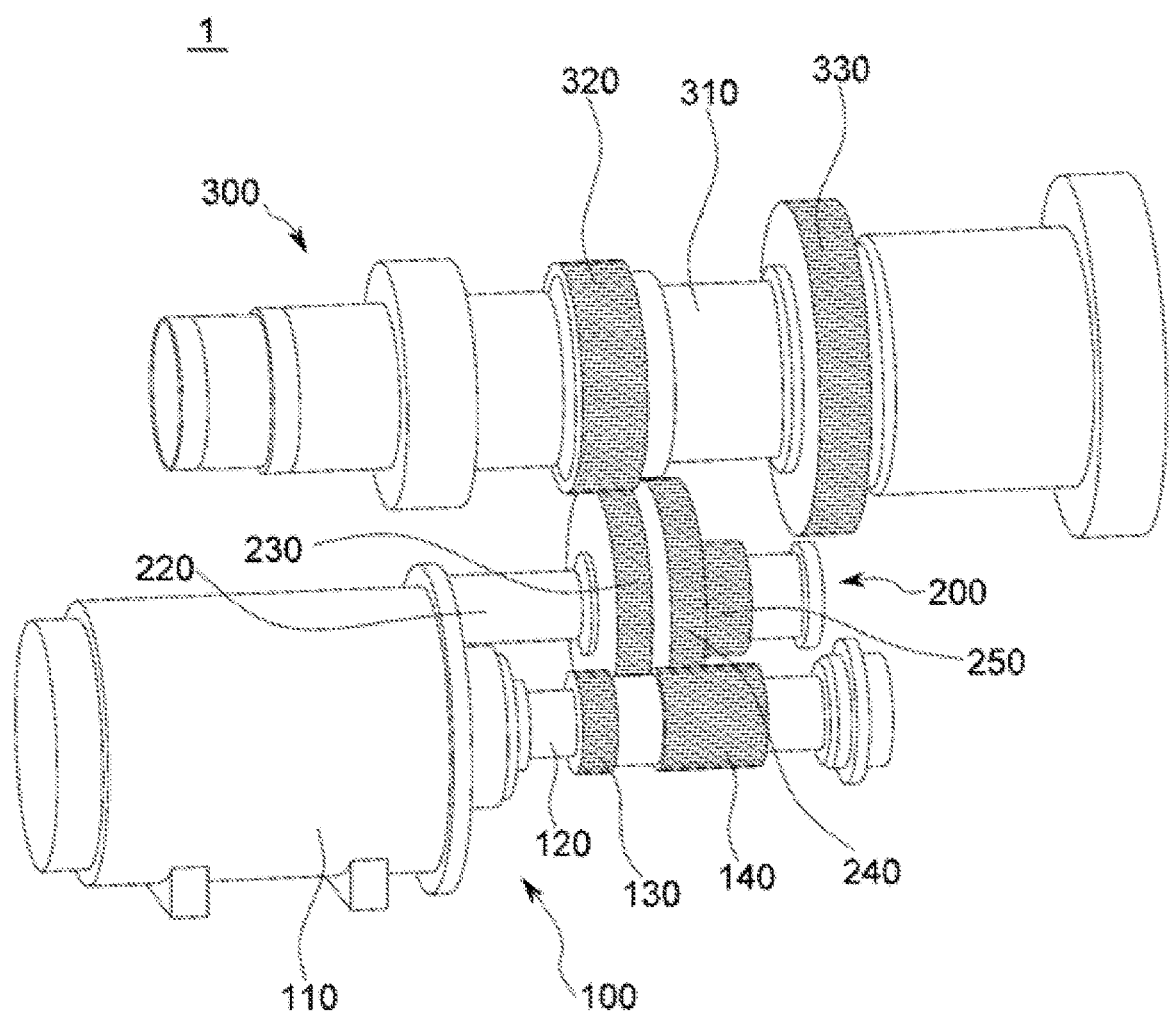

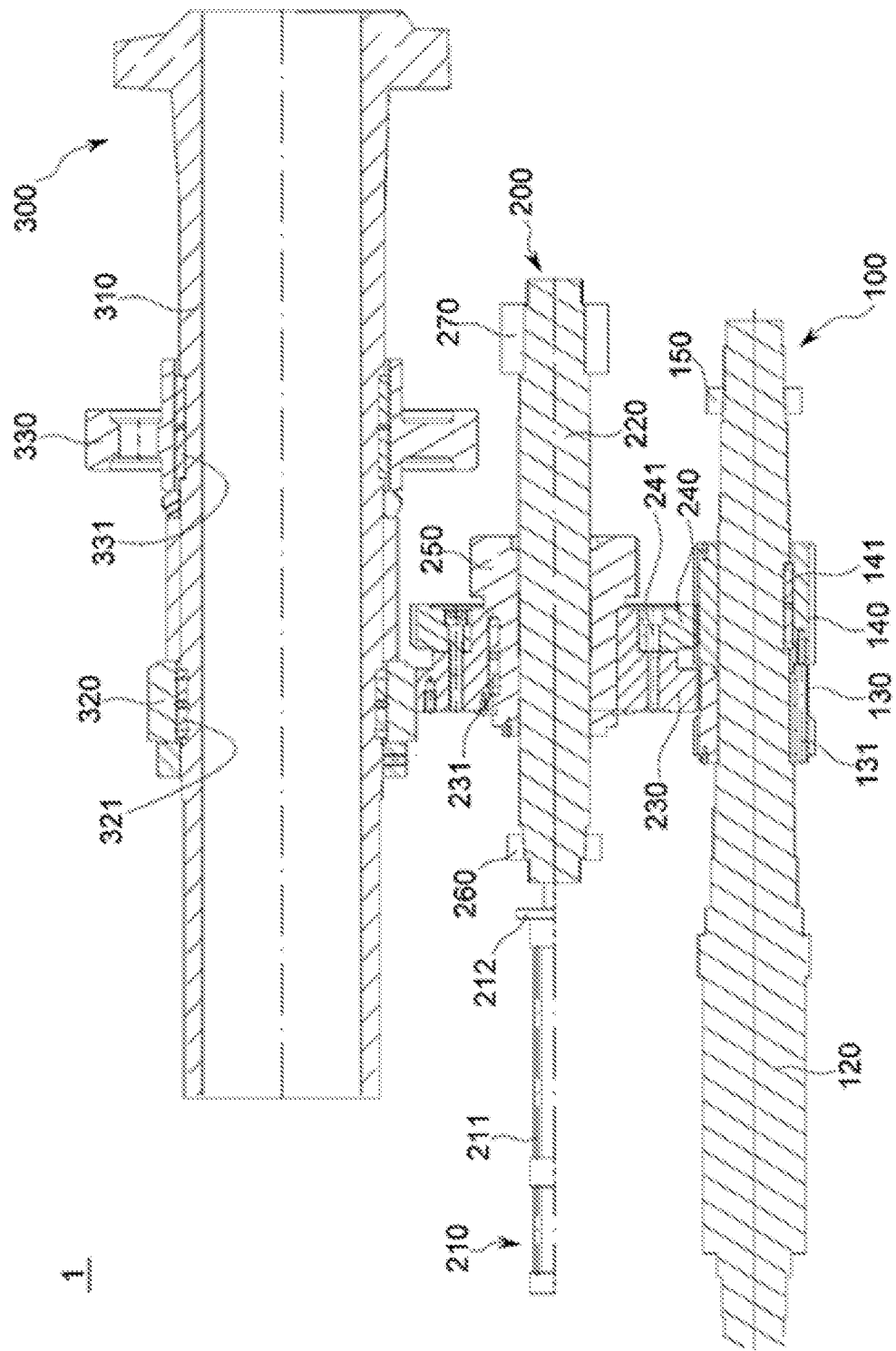
[Fig. 6]

[Fig. 7]
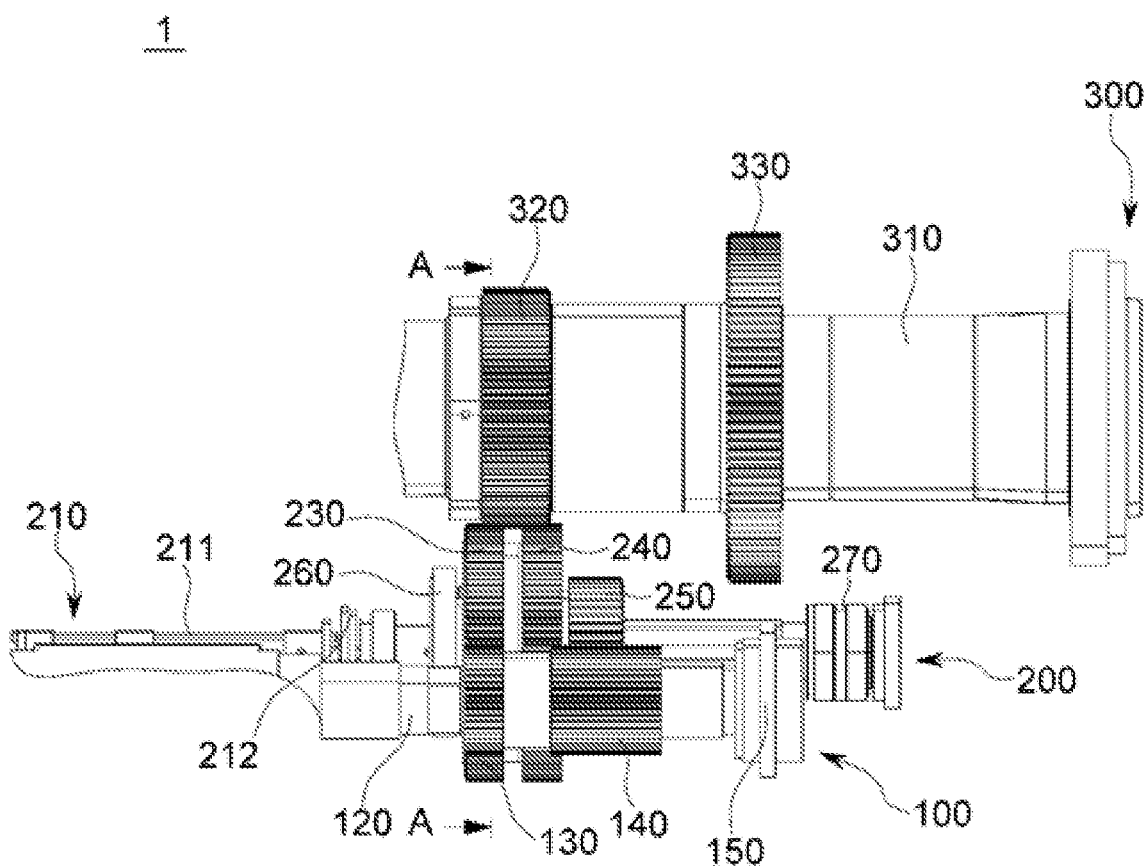

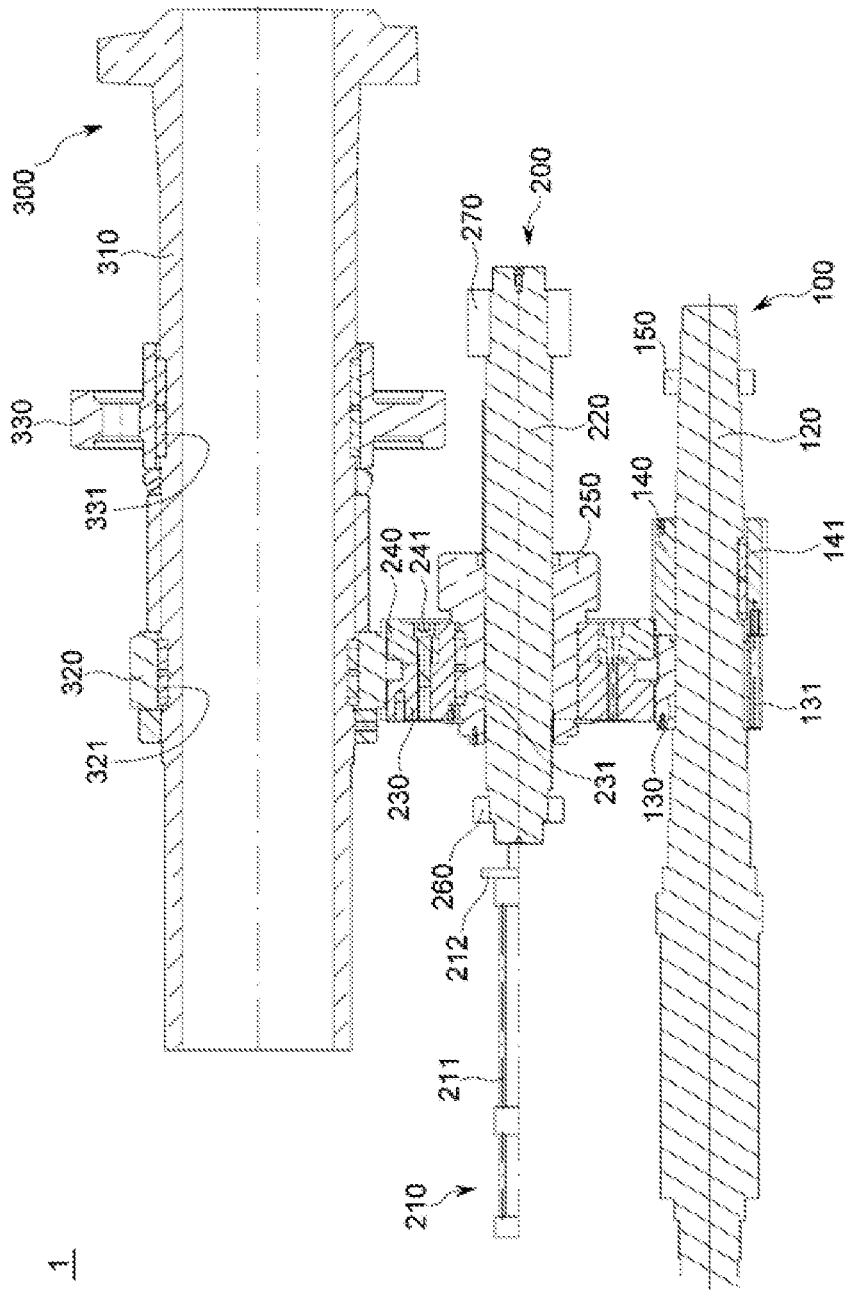
[Fig. 8]

[Fig. 9]
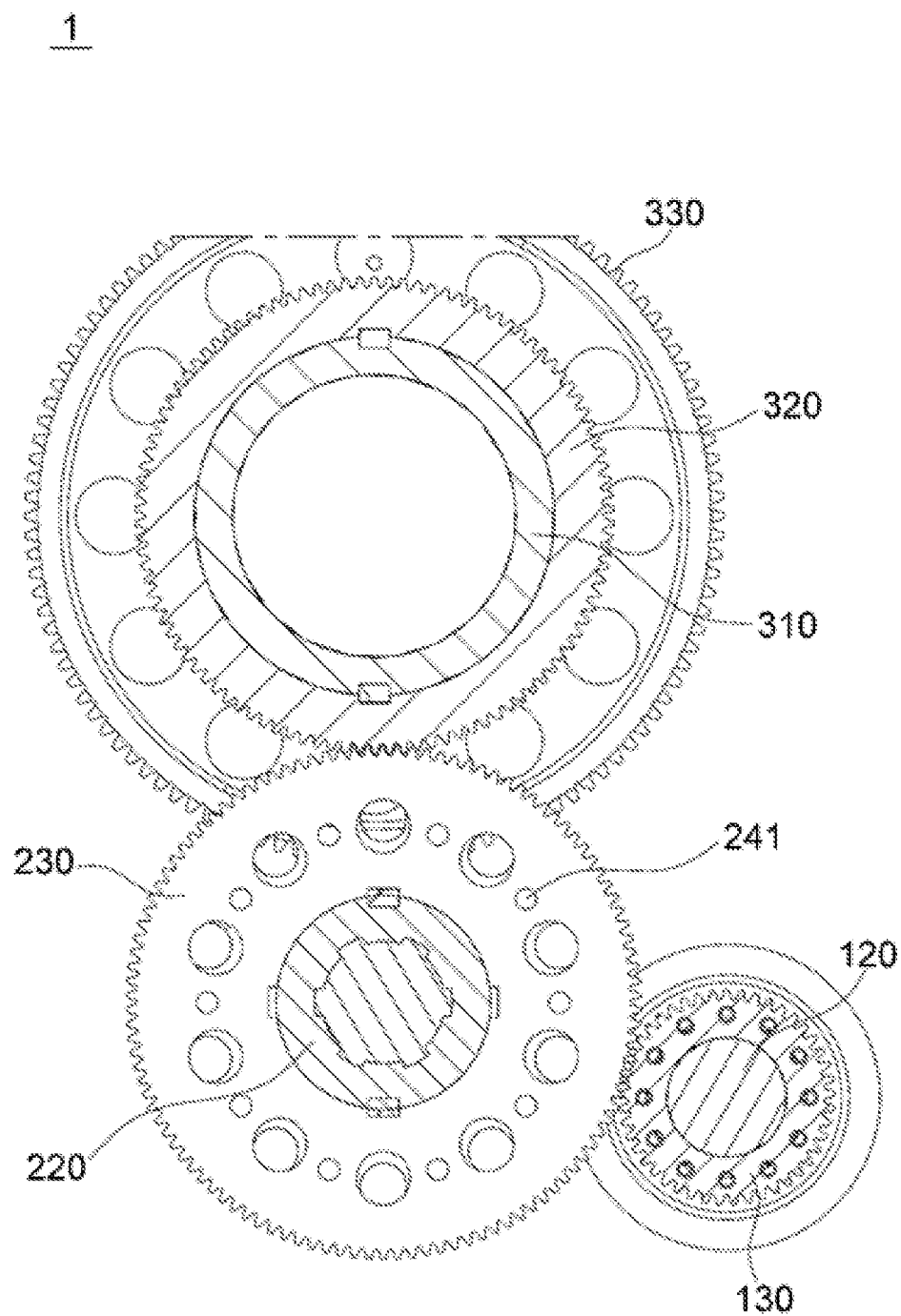

[Fig. 10]
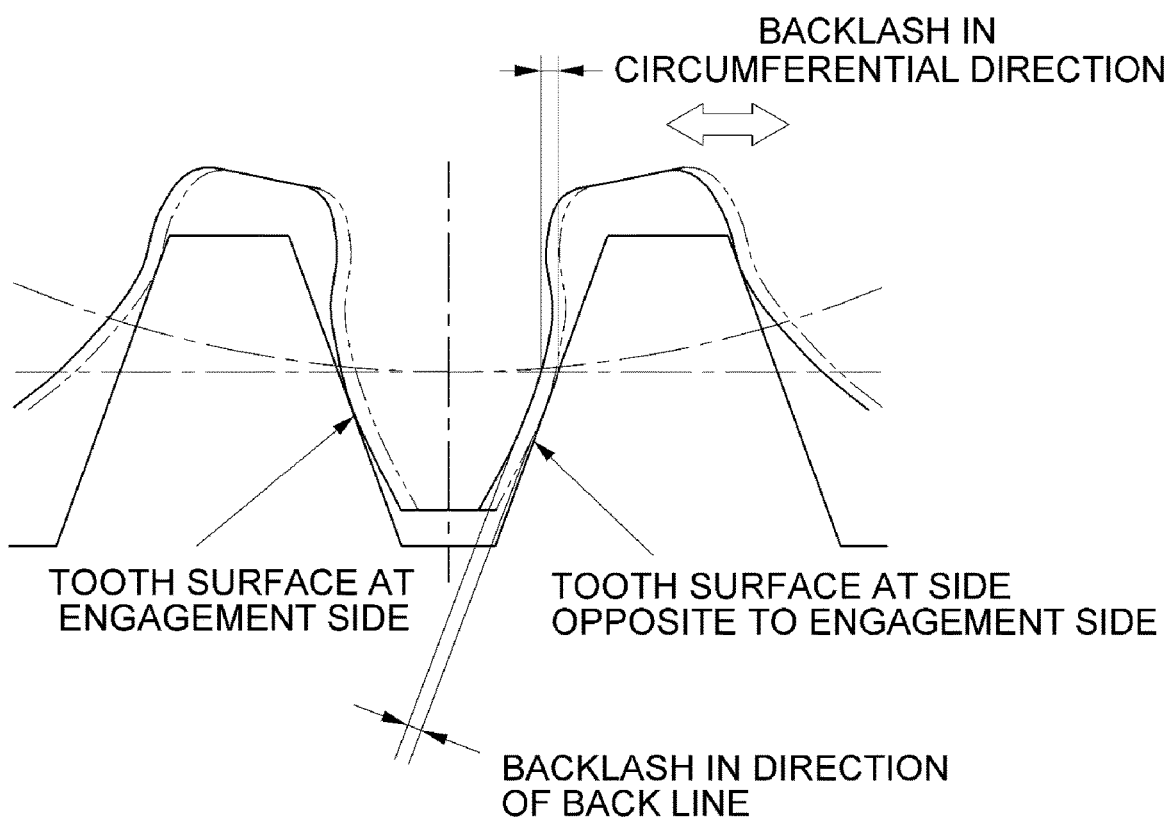

APPARATUS FOR OPERATING MAIN SHAFT OF MACHINE TOOL

CROSS-REFERENCE TO RELATED APPLICATIONS

This application is the U.S. National Phase under 35 U.S.C. § 371 of International Application No. PCT/KR2018/014403 filed on Nov. 22, 2018, which in turn claims the benefit of Korean Application No. 10-2017-0177747, filed on Dec. 22, 2017, the disclosures of which are incorporated by reference into the present application.

FIELD OF THE DISCLOSURE

The present disclosure relates to an apparatus for operating a main shaft of a machine tool, and more particularly, to an apparatus for operating a main shaft of a machine tool, wherein a single main shaft may operate in all of a high-speed mode, a low-speed mode, and a C-axis mode in accordance with a rectilinear movement of a transmission unit in a multi-tasking machining center.

BACKGROUND OF THE DISCLOSURE

In general, a machine tool refers to a machine used to process metal/non-metal workpieces in a desired shape and dimension using a suitable tool by using various types of cutting or non-cutting methods.

Various types of machine tools including a turning center, a vertical/horizontal machining center, a door-type machining center, a swiss turning machine, an electric discharge machine, a horizontal NC boring machine, a CNC lathe, and a multi-tasking machining center are being widely used in various industrial sites for the purpose of the corresponding work.

The multi-tasking machining center, among the machine tools, refers to a turning center equipped with a multifunctional automatic tool changer (ATC) and a tool magazine in order to perform various types of processing such as turning machining, drilling, tapping, or milling. In the case of the multi-tasking machining center, an operator manually mounts a tool on a tool magazine when loading the tool required for machining or changing the tools.

In general, various types of currently used machine tools each have a control panel to which a numerical control (NC) technology or a computerized numerical control (CNC) technology is applied. The control panel is provided with a multifunctional switch or button, and a monitor.

In addition, the machine tool includes a table on which a material, i.e., a workpiece is seated and which is transferred to machine the workpiece, a palette used to prepare the workpiece to be machined, a main shaft coupled to a tool or the workpiece and configured to be rotated, and a tailstock and a steady rest configured to support the workpiece during machining.

In general, the machine tool is provided with a transfer unit configured to transfer the table, a tool post, the main shaft, the tailstock, and the steady rest along a transfer shaft in order to perform various types of machining.

In general, the machine tool uses a plurality of tools in order to perform various types of machining, and a tool magazine or a turret is used in the form of a tool storage place for receiving and storing the plurality of tools.

The machine tool uses the plurality of tools in order to perform various types of machining, and the tool magazine is used in the form of a tool storage place for receiving and storing the plurality of tools.

In general, the machine tool is equipped with the automatic tool changer (ATC) configured to withdraw a specific tool from the tool magazine or remount the tool on the tool magazine based on an instruction of a numerical control unit in order to improve productivity of the machine tool.

In general, the machine tool is equipped with an automatic palette changer (APC) in order to minimize the non-processing time. The automatic palette changer (APC) automatically changes the palettes between a workpiece machining region and a workpiece loading region. The workpiece may be mounted on the palette.

In general, the turning center including the multi-tasking machining center may perform turning machining by controlling only a rotational speed of the main shaft and perform an operation (i.e., a C-axis function) of accurately controlling a position of the main shaft in order to perform milling, drilling, tapping, contouring, and the like by using the tool post.

As disclosed in Japanese Patent Publication No. 2016-182663, an apparatus for operating a main shaft of a machine tool in the related art has a problem in that production costs increase due to a combination of a worm gear and a servo motor.

In addition, Korean Patent No. 10-1506741 has a problem in that a power shaft and a driving shaft need to be coaxially provided, but the power shaft and the driving shaft cannot be substantially coaxially provided due to machine interference and because of structural properties of a multi-tasking turning center.

In addition, Korean Patent Publication No. 10-2012-0015738 and Korean Patent Publication No. 10-2013-0061933 have problems in that it is difficult to implement a high-speed mode such as turning during rotational speed control because of severe heat caused by an operation using gears, a servo motor is additionally required, production costs are increased because of the use of expensive gears such as a taper gear or a worm gear, and backlash severely occurs due to thermal deformation, which causes a deterioration in machining precision.

In addition, Korean Patent No. 10-0824522 and Korean Patent No. 10-1401204 have problems in that because backlash needs to be eliminated at one time for an entire drive mechanism in an assembled state, the backlash is not accurately adjusted for each engaged gear set, which causes a deterioration in machining precision, and production costs are increased due to a taper gear.

In addition, Korean Patent No. 10-1438230 has a problem in that an apparatus cannot be used for 5-axis machining because the apparatus may be stopped only at a predetermined index position.

In addition, Korean Patent No. 10-1514075 has a problem in that an apparatus cannot be miniaturized because of a complicated configuration, and production costs and maintenance costs are increased due to excessive assembly time.

As described above, the apparatus for operating a main shaft of a machine tool in the related art has a problem in that a large amount of costs is incurred for the assembly and production and the apparatus cannot be miniaturized because of a complicated configuration even though the apparatus is operated by performing any one or both of the rotational speed control and the accurate position control (i.e., the C-axis mode).

In addition, among the apparatuses for operating a main shaft of a machine tool in the related art, there is no apparatus for operating a main shaft that performs, with a single main shaft, a low-speed mode requiring high torque such as turning machining and a high-speed mode requiring a high-speed rotation such as rough machining, which are included in the rotational speed control modes, and the C-axis mode, which causes an inconvenience to a user and a deterioration in productivity.

Furthermore, the apparatus for operating a main shaft of a machine tool in the related art has a problem in that heat is generated by backlash even when performing any one of the rotational speed control modes and the C-axis mode, and machining precision deteriorates due to thermal deformation and backlash.

DISCLOSURE

Summary

The present disclosure has been made in an effort to solve the above-mentioned problems, and an object of the present disclosure is to provide an apparatus for operating a main shaft of a machine tool, wherein a single main shaft of a multi-tasking machining center operates in all of a high-speed mode, a low-speed mode, and a C-axis mode while maintaining or eliminating backlash as necessary by a change in arrangement of engagement of first, second, third, fourth, fifth, sixth, and seventh gears between an input unit and a transmission unit, and the transmission unit and an output unit in accordance with a rectilinear reciprocation of the transmission unit, and as a result, it is possible to reduce manufacturing costs, implement the compact machine tool by miniaturizing the apparatus for operating a main shaft, improve productivity by reducing the time taken to readjust the backlash, improve rigidity and durability through a simple shaft arrangement and a simple gear operating method, improve a consumer's satisfaction, and improve reliability and safety of the machine tool through a stable operation. In order to achieve the above-mentioned object, an apparatus for operating a main shaft of a machine tool according to the present disclosure includes: an input unit configured to transmit power for operating the main shaft; an output unit disposed in parallel with the input unit and configured to operate the main shaft with the power from the input unit; and a transmission unit disposed in parallel with the input unit and the output unit so as to be capable of rectilinearly reciprocating between the input unit and the output unit and configured to transmit the power from the input unit to the output unit, wherein the main shaft is capable of operating in a high-speed mode, a low-speed mode, or a C-axis mode in accordance with the rectilinear reciprocation of the transmission unit.

In addition, in another exemplary embodiment of the apparatus for operating a main shaft of a machine tool according to the present disclosure, the input unit and the transmission unit of the apparatus for operating a main shaft of a machine tool may operate at the same time by gear engagement, and the transmission unit and the output unit thereof may operate at the same time by gear engagement.

In addition, in another exemplary embodiment of the apparatus for operating a main shaft of a machine tool according to the present disclosure, a rectilinear reciprocation distance of the transmission unit may be changed in accordance with the high-speed mode, the low-speed mode, or the C-axis mode of the main shaft of the apparatus for operating a main shaft of a machine tool, and the arrangement of the gear engagement between the transmission unit and the input unit and the arrangement of the gear engagement between the transmission unit and the output unit may be changed in accordance with the change in rectilinear reciprocation distance of the transmission unit.

In addition, in another exemplary embodiment of the apparatus for operating a main shaft of a machine tool according to the present disclosure, the apparatus for operating a main shaft of a machine tool may further include a housing unit configured to partially or entirely cover the input unit, the output unit, and the transmission unit.

In addition, in another exemplary embodiment of the apparatus for operating a main shaft of a machine tool according to the present disclosure, the input unit of the apparatus for operating a main shaft of a machine tool may include: a driving unit configured to create power for operating the main shaft; a driving shaft rotatably installed at one side of the driving unit and configured to be rotated by the driving power from the driving unit; a first gear installed on the driving shaft; and a second gear installed on the driving shaft so as to be spaced apart from the first gear in a horizontal direction of the driving shaft.

In addition, in another exemplary embodiment of the apparatus for operating a main shaft of a machine tool according to the present disclosure, in the input unit of the apparatus for operating a main shaft of a machine tool, the second gear may be installed to be coupled to the driving shaft by means of a first fixing member, and the first gear may be installed to be coupled to the second gear by means of a first fastening member.

In addition, in another exemplary embodiment of the apparatus for operating a main shaft of a machine tool according to the present disclosure, the input unit of the apparatus for operating a main shaft of a machine tool may further include a first bearing installed at one end or both ends of the driving shaft in order to support the driving shaft.

In addition, in another exemplary embodiment of the apparatus for operating a main shaft of a machine tool according to the present disclosure, the output unit of the apparatus for operating a main shaft of a machine tool may include: an output shaft rotatably installed in parallel with the driving shaft; a sixth gear installed on the output shaft; and a seventh gear installed on the output shaft so as to be spaced apart from the sixth gear in the horizontal direction of the output shaft.

In addition, in another exemplary embodiment of the apparatus for operating a main shaft of a machine tool according to the present disclosure, in the output unit of the apparatus for operating a main shaft of a machine tool, the sixth gear may be installed to be coupled to the output shaft by means of a third fixing member, and the seventh gear may be installed to be coupled to the output shaft by means of a fourth fixing member.

In addition, in another exemplary embodiment of the apparatus for operating a main shaft of a machine tool according to the present disclosure, the transmission unit of the apparatus for operating a main shaft of a machine tool may include: a transfer unit configured to rectilinearly reciprocate the transmission unit between the driving shaft and the output shaft; a rotary shaft rotatably installed at one side of the transfer unit; a fifth gear installed on the rotary shaft; a third gear installed on the fifth gear so as to be spaced apart from the fifth gear in the horizontal direction of the rotary shaft; and a fourth gear installed on the fifth gear such that the fourth gear faces the third gear so as to be in parallel with the third gear and is spaced apart from the third gear in the horizontal direction of the rotary shaft.

In addition, in another exemplary embodiment of the apparatus for operating a main shaft of a machine tool according to the present disclosure, the third gear of the transmission unit of the apparatus for operating a main shaft of a machine tool may be is installed to be coupled to the rotary shaft by means of a second fixing member, the fourth gear may be installed to be coupled to the third gear by means of a second fastening member, and the fifth gear may be coupled to the rotary shaft by spline engagement.

In addition, in another exemplary embodiment of the apparatus for operating a main shaft of a machine tool according to the present disclosure, the transfer unit of the transmission unit of the apparatus for operating a main shaft of a machine tool may include: a cylinder configured to rectilinearly reciprocate the rotary shaft between the driving shaft and the output shaft; and a connecting bracket installed at a tip of the cylinder and installed to be connected to the rotary shaft.

In addition, in another exemplary embodiment of the apparatus for operating a main shaft of a machine tool according to the present disclosure, the transmission unit of the apparatus for operating a main shaft of a machine tool may further include second and third bearings installed at both ends of the rotary shaft in order to support the rotary shaft.

In addition, in another exemplary embodiment of the apparatus for operating a main shaft of a machine tool according to the present disclosure, when the main shaft of the apparatus for operating a main shaft of a machine tool operates in the low-speed mode, the transfer unit may operate such that the rotary shaft is positioned between the driving shaft and the output shaft so that the second gear engages with the third gear while being in external contact with the third gear and the fifth gear engages with the seventh gear while being in external contact with the seventh gear.

In addition, in another exemplary embodiment of the apparatus for operating a main shaft of a machine tool according to the present disclosure, when the main shaft of the apparatus for operating a main shaft of a machine tool operates in the high-speed mode, the transfer unit may operate such that the rotary shaft is positioned between the driving shaft and the output shaft so that the second gear engages with the fourth gear while being in external contact with the fourth gear and the third gear engages with the sixth gear while being in external contact with the sixth gear.

In addition, in another exemplary embodiment of the apparatus for operating a main shaft of a machine tool according to the present disclosure, when the main shaft of the apparatus for operating a main shaft of a machine tool operates in the C-axis mode, the transfer unit may operate such that the rotary shaft is positioned between the driving shaft and the output shaft so that the second gear engages with the fourth gear while being in external contact with a part of a tooth surface of the fourth gear, the first gear engages with the third gear while being in external contact with a part of a tooth surface of the third gear, the third gear engages with the sixth gear while a part of the tooth surface of the third gear is in external contact with one side of a tooth surface of the sixth gear, and the fourth gear engages with the sixth gear while a part of the tooth surface of the fourth gear is in external contact with the other side of the tooth surface of the sixth gear.

In addition, in another exemplary embodiment of the apparatus for operating a main shaft of a machine tool according to the present disclosure, a horizontal length of the second gear of the input unit of the apparatus for operating a main shaft of a machine tool may be larger than a horizontal length of the first gear.

In addition, in another exemplary embodiment of the apparatus for operating a main shaft of a machine tool according to the present disclosure, a diameter of the seventh gear of the output unit of the apparatus for operating a main shaft of a machine tool may be larger than a diameter of the sixth gear.

In addition, in another exemplary embodiment of the apparatus for operating a main shaft of a machine tool according to the present disclosure, a diameter of the third gear of the transmission unit of the apparatus for operating a main shaft of a machine tool and a diameter of the fourth gear may be equal to each other, and the diameter of the third gear and the diameter of the fourth gear may be larger than a diameter of the fifth gear.

In addition, in another exemplary embodiment of the apparatus for operating a main shaft of a machine tool according to the present disclosure, each of the first, second, third, fourth, fifth, sixth, and seventh gears of the apparatus for operating a main shaft of a machine tool may be configured as a spur gear.

According to the apparatus for operating a main shaft of a machine tool according to the present disclosure, a single main shaft of a multi-tasking machining center operates in all of the high-speed mode, the low-speed mode, and the C-axis mode while maintaining or eliminating the backlash as necessary by the change in arrangement of the engagement of the first, second, third, fourth, fifth, sixth, and seventh gears between the input unit, the transmission unit, and the output unit in accordance with the rectilinear reciprocation of the transmission unit. As a result, it is possible to reduce manufacturing costs and improve stability and reliability of the machine tool.

In addition, according to the apparatus for operating a main shaft of a machine tool according to the present disclosure, the single main shaft operates in all of the high-speed mode, the low-speed mode, and the C-axis mode, such that it is possible to implement the compact machine tool by miniaturizing the apparatus for operating a main shaft.

Further, according to the apparatus for operating a main shaft of a machine tool according to the present disclosure, the main shaft operates in the three modes while maintaining or eliminating the backlash as necessary in accordance with the corresponding mode, such that it is possible to improve productivity by reducing the time taken to readjust the backlash, prevent thermal deformation caused by heat generated by the backlash, and improve machining precision.

Moreover, according to the apparatus for operating a main shaft of a machine tool according to the present disclosure, it is possible to improve rigidity and durability through a simple shaft arrangement and a simple gear operating method and improve a consumer's satisfaction.

DESCRIPTION OF THE DRAWINGS

FIG. 1 is a perspective view illustrating an apparatus for operating a main shaft of a machine tool according to an exemplary embodiment of the present disclosure.

FIG. 2 is a perspective view illustrating the apparatus for operating a main shaft of a machine tool in a state wherein a housing illustrated in FIG. 1 is removed.

FIG. 3 is a perspective view illustrating the apparatus for operating a main shaft of a machine tool according to the exemplary embodiment of the present disclosure when the apparatus illustrated in FIG. 2 is in a low-speed mode.

FIG. 4 is a cross-sectional view of FIG. 3.

FIG. 5 is a perspective view illustrating the apparatus for operating a main shaft of a machine tool according to the exemplary embodiment of the present disclosure when the apparatus illustrated in FIG. 2 is in a high-speed mode.

FIG. 6 is a cross-sectional view of FIG. 5.

FIG. 7 is a perspective view illustrating the apparatus for operating a main shaft of a machine tool according to the exemplary embodiment of the present disclosure when the apparatus illustrated in FIG. 2 is in a C-axis mode.

FIG. 8 is a cross-sectional view of FIG. 7.

FIG. 9 is a cross-sectional view taken along line A-A in FIG. 7.

FIG. 10 is a conceptual view for explaining a principle for reducing backlash in the C-axis mode.

DESCRIPTION OF MAIN REFERENCE NUMERALS OF DRAWINGS

1: Apparatus for operating main shaft
100: Input unit
110: Driving unit
120: Driving shaft
130: First gear
131: First fastening member
140: Second gear
141: First fixing member
150: First bearing
200: Transmission unit
210: Transfer unit
211: Cylinder
212: Connecting bracket
220: Rotary shaft
230: Third gear
231: Second fixing member
240: Fourth gear
241: Second fastening member
250: Fifth gear
260: Second bearing
270: Third bearing
300: Output unit
310: Output shaft
320: Sixth gear
321: Third fixing member
330: Seventh gear
331: Fourth fixing member
400: Housing unit

DETAILED DESCRIPTION OF CERTAIN INVENTIVE EMBODIMENT

Hereinafter, an apparatus for operating a main shaft of a machine tool according to an exemplary embodiment of the present disclosure will be described in detail with respect to the drawings. The following exemplary embodiments are provided as examples for fully transferring the spirit of the present disclosure to those skilled in the art. Therefore, the present disclosure is not limited to the exemplary embodiments described below and may be specified as other aspects. Further, in the drawings, a size and a thickness of the apparatus may be exaggerated for convenience. Like reference numerals indicate like constituent elements throughout the specification.

Advantages and features of the present disclosure and methods of achieving the advantages and features will be clear with reference to exemplary embodiments described in detail below together with the accompanying drawings. However, the present disclosure is not limited to the exemplary embodiments disclosed herein but will be implemented in various forms. The exemplary embodiments of the present disclosure are provided so that the present disclosure is completely disclosed, and a person with ordinary skill in the art can fully understand the scope of the present disclosure. The present disclosure will be defined only by the scope of the appended claims. Like reference numerals indicate like constituent elements throughout the specification. In the drawings, sizes and relative sizes of layers and regions may be exaggerated for clarity of description.

The terms used in the present specification are for explaining the exemplary embodiments, not for limiting the present disclosure. Unless particularly stated otherwise in the present specification, a singular form also includes a plural form. The terms such as "comprise (include)" and/or "comprising (including)" used in the specification do not exclude presence or addition of one or more other constituent elements, steps, operations, and/or elements, in addition to the mentioned constituent elements, steps, operations, and/or elements.

FIG. 1 is a perspective view illustrating an apparatus for operating a main shaft of a machine tool according to an exemplary embodiment of the present disclosure, and FIG. 2 is a perspective view illustrating the apparatus for operating a main shaft of a machine tool in a state wherein a housing illustrated in FIG. 1 is removed. FIG. 3 is a perspective view illustrating the apparatus for operating a main shaft of a machine tool according to the exemplary embodiment of the present disclosure when the apparatus illustrated in FIG. 2 is in a low-speed mode, and FIG. 4 is a cross-sectional view of FIG. 3. FIG. 5 is a perspective view illustrating the apparatus for operating a main shaft of a machine tool according to the exemplary embodiment of the present disclosure when the apparatus illustrated in FIG. 2 is in a high-speed mode, and FIG. 6 is a cross-sectional view of FIG. 5. FIG. 7 is a perspective view illustrating the apparatus for operating a main shaft of a machine tool according to the exemplary embodiment of the present disclosure when the apparatus illustrated in FIG. 2 is in a C-axis mode, FIG. 8 is a cross-sectional view of FIG. 7, and FIG. 9 is a cross-sectional view taken along line A-A in FIG. 7. FIG. 10 is a conceptual view for explaining a principle for reducing backlash in the C-axis mode.

The terms used below are defined as follows. The term "horizontal direction" means a horizontal direction in the same member, the term "vertical direction" means a vertical direction in the same member orthogonal to the horizontal direction, and the term "height direction" means a height direction in the same member orthogonal to the horizontal direction and the vertical direction.

An apparatus 1 for operating a main shaft of a machine tool according to the exemplary embodiment of the present disclosure will be described with reference to FIGS. 1 to 9. As illustrated in FIGS. 1 to 9, the apparatus 1 for operating a main shaft of a machine tool according to the exemplary embodiment of the present disclosure includes an input unit 100, a transmission unit 200, and an output unit 300.

The input unit 100 transmits power for operating the main shaft. Although not illustrated in the drawings, a column or a saddle is installed at one side of the machine tool, a column, a saddle, or a spindle head is installed, and the main shaft may be installed on the spindle head. In the present disclosure, the main shaft may mean a shaft that holds a workpiece and rotates.

The output unit 300 is disposed in parallel with the input unit 100. In addition, the output unit 300 receives the power from the input unit 100 through the transmission unit 200 to be described below, thereby operating the main shaft with the power.

The transmission unit 200 is disposed in parallel with the input unit 100 and the output unit 300 and may rectilinearly reciprocate between the input unit 100 and the output unit 300. That is, the input unit 100, the transmission unit 200, and the output unit 300 all are disposed in parallel with one another in a predetermined minimum space, such that a structure may be simplified, the apparatus 1 for operating a main shaft may be miniaturized, and as a result, the machine tool may be compact. In addition, the transmission unit 200 transmits the power from the input unit 100 to the output unit 300.

The main shaft may perform a high-speed mode (rotational speed control), a low-speed mode (rotational speed control), or a C-axis mode (precise position control) in accordance with a rectilinear reciprocation of a cylinder 211 of a transfer unit 210 of the transmission unit 200 which will be described below.

The low-speed mode (see FIGS. 3 and 4) is, but not necessarily limited to, a mode wherein a high-torque/low-speed rotation is required in order to strongly cut an outer diameter of the workpiece. During the high-torque/low-speed rotation, gear backlash is necessarily required to smoothly rotate gears. That is, in the low-speed mode, the backlash is required for the smooth rotations of the gears and a high gear ratio for the low-speed rotation and the high torque.

The high-speed mode (see FIGS. 5 and 6) is, but not necessarily limited to, a mode wherein a low-torque/high-speed rotation is required in accordance with a finish grinding or cutting condition. Even during the low-torque/high-speed rotation, the gear backlash is necessarily required to smoothly rotate the gears. That is, in the high-speed mode, the backlash is required for the smooth rotations of the gears and a low gear ratio for the high-speed rotation and the low torque.

The C-axis mode (see FIGS. 7 to 10) is, but not necessarily limited to, a mode wherein the accurate position control is required for the main shaft in order to perform machining such as milling, drilling, tapping, and contouring using a tool post. C-axis division precision is very important when performing 5-axis machining such as contouring including a forward rotation or a reverse rotation at a very low speed, and this case is defined as the C-axis mode. That is, in order to perform the precise position control, the C-axis mode requires a state wherein the backlash is minimized and the rotational speed is very low.

The input unit 100, the transmission unit 200, and the output unit 300 are rotated along with an operation of a driving unit 110 through gear engagement in accordance with respective situations of first, second, third, fourth, fifth, sixth, and seventh gears 130, 140, 230, 240, 250, 320, and 330 to be described below.

That is, a rectilinear reciprocation distance of the transmission unit 200 is changed in accordance with the high-speed mode, the low-speed mode, or the C-axis mode of the main shaft, and the arrangement of the gear engagement of the first, second, third, fourth, and fifth gears 130, 140, 230, 240, and 250 between the transmission unit 200 and the input unit 100 and the arrangement of the gear engagement of the third, fourth, fifth, sixth, and seventh gears 230, 240, 250, 320, and 330 between the transmission unit 200 and the output unit 300 are changed in accordance with the change in rectilinear reciprocation distance of the transmission unit 200.

According to the apparatus for operating a main shaft of a machine tool according to the present disclosure, a single main shaft of a multi-tasking machining center performs all of the high-speed mode, the low-speed mode, and the C-axis mode while maintaining or eliminating the backlash as necessary by the change in arrangement of the engagement of the first, second, third, fourth, fifth, sixth, and seventh gears between the input unit, the transmission unit, and the output unit in accordance with the rectilinear reciprocation of the transmission unit. As a result, it is possible to reduce manufacturing costs and improve stability and reliability of the machine tool.

As illustrated in FIG. 1, the apparatus 1 for operating a main shaft of a machine tool according to the exemplary embodiment of the present disclosure may further include a housing unit 400 configured to partially or entirely cover the input unit 100, the output unit 300, and the transmission unit 200 in order to protect the input unit 100, the transmission unit 200, and the output unit 300 from foreign substances such as machining chips or cutting oil, thereby reducing maintenance costs, improving durability, and implementing stable management. That is, the input unit 100, the output unit 300, and the transmission unit 200 may be installed in the housing unit 400. The housing unit 400 defines an external shape of the apparatus for operating a main shaft. The housing unit 400 may be formed in, but not necessarily limited to, an approximately hexahedral shape having a cavity therein.

As illustrated in FIGS. 1 to 9, the input unit 100 of the apparatus 1 for operating a main shaft of a machine tool according to the exemplary embodiment of the present disclosure includes a driving unit 110, a driving shaft 120, the first gear 130, and the second gear 140.

The driving unit 110 creates power for operating the main shaft. The driving unit 110 is installed at one side of the input unit, and the driving unit 110 is configured as a servo motor or a motor and operated based on an instruction of a PLC or a numerical control unit, but the present disclosure is not necessarily limited thereto.

In addition, the numerical control unit includes numerical control (NC) or computerized numerical control (CNC) and is embedded with various types of numerical control programs. That is, the numerical control unit is embedded with a program for operating the servo motor which is the driving unit and a program for operating the tools, and the corresponding program is automatically loaded and executed based on the operation of the numerical control unit. In addition, the numerical control unit communicates with a main operating unit and the PLC through a predetermined protocol.

In addition, the main operating unit includes a screen display program and a data input program in accordance with a selection of a screen display and performs a function of displaying a software switch on a display screen in accordance with an output of the screen display program and a function of recognizing an ON/OFF state of the software switch and making an instruction about an input and an output for an operation of the machine.

In addition, the main operating unit has a monitor installed in or at one side of a housing or a casing of the machine tool and capable of displaying multifunctional switches or buttons and various types of information, but the present disclosure is not necessarily limited thereto.

The PLC (programmable logic controller) communicates with the numerical control unit or the main operating unit through the predetermined protocol and serves to make a control instruction through this communication. That is, the PLC operates by receiving a control instruction based on the numerical control program for the numerical control unit or the main operating unit.

The driving shaft 120 is rotatably installed at one side of the driving unit 110 and rotated by the driving power from the driving unit 110. The driving shaft 120 may be inserted into and integrally formed with a rotary shaft of the driving unit 110, that is, the servo motor, but the present disclosure is not necessarily limited thereto.

The first gear 130 is installed on the driving shaft 120. The first gear 130 is installed to be coupled to the second gear 140 by means of a first fastening member 131. That is, since the first gear 130 is installed to be coupled to the second gear 140 by the first fastening member 131 such as a bolt or a rivet, such that the first gear 130 is also rotated at the same time integrally with the second gear 140 by the rotation of the second gear 140.

The second gear 140 is installed on the driving shaft 120 so as to be spaced apart from the first gear 130 in a horizontal direction of the driving shaft 120. The second gear 140 is installed to be coupled to the driving shaft 120 by means of a first fixing member 141. That is, a groove is formed in the driving shaft 120, and the second gear 140 is installed to be coupled to the driving shaft 120 by mean of the groove and the first fixing member 141 such as a key. Therefore, when the driving shaft 120 is rotated, the second gear 140 is integrally rotated at the same time.

As illustrated in FIGS. 1 to 9, the input unit 100 of the apparatus 1 for operating a main shaft of a machine tool according to the exemplary embodiment of the present disclosure further includes a first bearing 150 installed at one end or both ends of the driving shaft 120 in order to support the driving shaft 120. Since the first bearing 150 stably supports the driving shaft 120, vibration, abrasion, or heat generation is minimized when the driving shaft 120 is rotated, such that it is possible to improve machining precision, reduce maintenance costs, and improve durability and reliability of the machine tool.

As illustrated in FIGS. 1 to 9, the output unit 300 of the apparatus 1 for operating a main shaft of a machine tool according to the exemplary embodiment of the present disclosure includes an output shaft 310, the sixth gear 320, and the seventh gear 330.

The output shaft 310 is rotatably installed in parallel with the driving shaft 120.

The sixth gear 320 is installed on the output shaft 310. The sixth gear 320 is installed to be coupled to the output shaft 310 by means of a third fixing member 321. That is, a groove is formed in the output shaft 310, and the sixth gear 320 is installed to be coupled to the output shaft 310 by means of the groove and the third fixing member 321 such as a key. Therefore, when the output shaft 310 is rotated or the seventh gear 330 is rotated, the sixth gear 320 is also integrally rotated at the same time.

The seventh gear 330 is installed on the output shaft 310 so as to be spaced apart from the sixth gear 320 in the horizontal direction of the output shaft 310. The seventh gear 330 is installed to be coupled to the output shaft 310 by means of a fourth fixing member 331. That is, a groove is formed in the output shaft 310, and the seventh gear 330 is installed to be coupled to the output shaft 310 by means of the groove and the fourth fixing member 331 such as a key. Therefore, when the output shaft 310 is rotated or the sixth gear 320 is rotated, the seventh gear 330 is also integrally rotated at the same time.

As illustrated in FIGS. 1 to 9, the transmission unit 200 of the apparatus 1 for operating a main shaft of a machine tool according to the exemplary embodiment of the present disclosure includes the transfer unit 210, a rotary shaft 220, the third gear 230, the fourth gear 240, and the fifth gear 250.

The transfer unit 210 rectilinearly reciprocates the transmission unit 200 between the driving shaft 120 and the output shaft 310 in accordance with the high-speed mode, the low-speed mode, and the C-axis mode of the main shaft.

The transfer unit 210 is installed at one side of the transmission unit. The third gear 230, the fourth gear 240, and the fifth gear 250 are supported on the rotary shaft 220, and the transfer unit 210 includes the cylinder 211 configured to rectilinearly reciprocate the third gear 230, the fourth gear 240, and the fifth gear 250 between the driving shaft 120 and the output shaft 310, and a connecting bracket 212 installed at a tip of the cylinder and coupled to one side of the rotary shaft 220.

The cylinder 211 is a hydraulic or pneumatic cylinder, a piston is rectilinearly reciprocated by hydraulic or pneumatic pressure, and the connecting bracket 212 is installed at a tip of the piston.

The cylinder 211, that is, the transfer unit 210 operates based on an instruction from the PLC or the numerical control unit.

The rotary shaft 220 is rotatably installed at one side of the transfer unit 210 so as to be in parallel with the driving shaft 120 and the output shaft 310.

The fifth gear 250 is supported on the rotary shaft 220, and the third gear 230 is installed on the fifth gear 250 so as to be spaced apart from gear teeth of the fifth gear 250 in the horizontal direction of the rotary shaft 220. The fifth gear 250 is supported on the rotary shaft 220, and the third gear 230 is installed to be coupled to the fifth gear 250 by means of a second fixing member 231. That is, a groove is formed in the fifth gear 250, and the third gear 230 is installed to be coupled to the rotary shaft 220 by means of the groove and the second fixing member 231 such as a key. Therefore, when the rotary shaft 230 and the fifth gear 250 are rotated, the third gear 230 is integrally rotated at the same time.

The fifth gear 250 is supported on the rotary shaft 220, and the fourth gear 240 is installed on the fifth gear 250 such that the fourth gear 240 faces the third gear 230 so as to be in parallel with the third gear 230 and is spaced apart from the third gear 230 in the horizontal direction of the rotary shaft 220. The fourth gear 240 is installed to be coupled to the third gear 230 by means of a second fastening member 241. That is, since the fourth gear 240 is installed to be coupled to the third gear 230 by means of the second fastening member 241 such as a bolt or a rivet, such that the fourth gear 240 is also rotated at the same time integrally with the third gear 230 by the rotation of the third gear 230.

The fifth gear 250 is installed to be supported on the rotary shaft 220. As described above, the third gear 230, the fourth gear 240, and the fifth gear 250 are sequentially installed on the rotary shaft 220 from one side to the other side of the rotary shaft 220 in a way wherein the third gear 230 and the fourth gear 240 are assembled to the fifth gear 250. The fifth gear 250 is installed to be coupled to the rotary shaft 220 by spline engagement by means of a spline structure. Therefore, when the rotary shaft 220 is rotated or the third gear 230 or the fourth gear 240 is rotated, the fifth gear 250 is also integrally rotated at the same time.

As illustrated in FIGS. 1 to 9, the transmission unit 200 of the apparatus 1 for operating a main shaft of a machine tool according to the exemplary embodiment of the present disclosure further includes second and third bearings 260 and 270 installed at both ends of the rotary shaft 220 in order to support the rotary shaft 220. FIGS. 1 to 9 illustrate that the second bearing 260 is installed at the left side of the rotary shaft 220 and the third bearing 270 is installed at the right side of the rotary shaft, but the present disclosure is not necessarily limited thereto. When the second bearing 260 is installed at one side of the rotary shaft, the third bearing 270 is installed at the other side of the rotary shaft, and vice versa. The second and third bearings 260 and 270 stably support the rotary shaft 220, such that the power from the input unit 100 may be safely transmitted to the output unit 300, and vibration, abrasion, or heat generation may be minimized when the rotary shaft 220 is rotated, as a result of which it is possible to improve machining precision, reduce maintenance costs, and improve durability and reliability of the machine tool.

As illustrated in FIG. 4, according to the exemplary embodiment of the present disclosure, a horizontal length W2 of the second gear of the input unit 100 is larger than a horizontal length W1 of the first gear (W2>W1). In addition, a diameter D1 of the first gear of the input unit 100 may be equal to a diameter D2 of the second gear (D1=D2).

In addition, as illustrated in FIG. 4, according to the exemplary embodiment of the present disclosure, a diameter D7 of the seventh gear of the output unit 300 is larger than a diameter D6 of the sixth gear (D7>D6). In addition, a horizontal length W6 of the sixth gear of the output unit 300 may be larger than a horizontal length W7 of the seventh gear (W6>W7).

In addition, as illustrated in FIG. 4, according to the exemplary embodiment of the present disclosure, a diameter D3 of the third gear of the transmission unit 200 is equal to a diameter D4 of the fourth gear, and the diameter D3 of the third gear and the diameter D4 of the fourth gear are larger than a diameter D5 of the fifth gear (D3=D4>D5). In addition, a horizontal length W3 of the third gear is equal to a horizontal length W4 of the fourth gear, and a horizontal length W5 of the fifth gear is larger than the horizontal length W3 of the third gear and the horizontal length W4 of the fourth gear (W3=W4<W5).

Therefore, in the high-speed mode, the low-speed mode, and the C-axis mode, the power from the driving unit 110 is stably transmitted to the transmission unit 200 by the engagement of the first and second gears 130 and 140 of the driving shaft 120 with the third, fourth, and fifth gears 230, 240, and 250. The power from the rotary shaft 220 of the transmission unit 200 may be easily transmitted to the output shaft 310 by the engagement of the third, fourth, and fifth gears 230, 240, and 250 with the sixth and seventh gears 320 and 330 in accordance with the corresponding mode while minimizing or maintaining backlash.

An operational principle when the main shaft of the apparatus 1 for operating a main shaft of a machine tool according to the present disclosure operates in the low-speed mode will be described with reference to FIGS. 3 and 4. As illustrated in FIGS. 3 and 4, when the main shaft operates in the low-speed mode, the cylinder 211 of the transfer unit 210 horizontally moves based on an instruction of the PLC or the numerical control unit, such that the third, fourth, and fifth gears 230, 240, and 250 coupled to the rotary shaft 220 are moved to the positions illustrated in FIGS. 3 and 4. As described above, the high-torque/low-speed rotation is required when the main shaft operates in the low-speed mode (see FIGS. 3 and 4). During the high-torque/low-speed rotation, the gear backlash is necessarily required to smoothly rotate gears. That is, in the low-speed mode, the backlash is required for the smooth rotations of the gears and a high gear ratio for the low-speed rotation and the high torque.

As described above, when the main shaft operates in the low-speed mode, the cylinder 211 of the transfer unit 210 operates such that the third, fourth, and fifth gears 230, 240, and 250 coupled to the rotary shaft 220 are positioned between the driving shaft 120 and the output shaft 310 so that the second gear 140 engages with the third gear 230 while being in external contact with the third gear 230 and the fifth gear 250 engages with the seventh gear 330 while being in external contact with the seventh gear 330.

When rotational power is transmitted to the driving shaft 120 by the driving unit 110 of the input unit, the fifth gear 250, which is coupled to the rotary shaft 220 of the transmission unit 200 by the spline engagement, is rotated by the power transmitted through the second gear 140 fastened and coupled by the first fixing member 141. This spline engagement may prevent a gear slip caused by high torque.

Thereafter, the rotary shaft 220 is rotated by the rotation of the fifth gear 250, and the rotational power is transmitted to the seventh gear 330 coupled to the output shaft 310 by the fourth fixing member 331, such that the seventh gear 330 is rotated. In this case, the torque increases to the extent of the gear ratio.

In addition, since the second gear engages with the third gear while being in external contact with the third gear and the fifth gear engages with the seventh gear while being in external contact with the seventh gear, normal backlash is provided, such that no jamming occurs due to a lack of backlash during the rotation. The output shaft 310 fastened and coupled to the seventh gear 330 by the fourth fixing member 331 is rotated.

An operational principle when the main shaft of the apparatus 1 for operating a main shaft of a machine tool according to the present disclosure operates in the high-speed mode will be described with reference to FIGS. 5 and 6. As illustrated in FIGS. 5 and 6, when the main shaft operates in the high-speed mode, the cylinder 211 of the transfer unit 210 horizontally moves based on an instruction of the PLC or the numerical control unit, such that the third, fourth, and fifth gears 230, 240, and 250 coupled to the rotary shaft 220 are moved to the positions illustrated in FIGS. 5 and 6.

As described above, the low-torque/high-speed rotation is required when the main shaft operates in the high-speed mode (see FIGS. 5 and 6). Even during the low-torque/high-speed rotation, the gear backlash is necessarily required to smoothly rotate the gears. That is, in the high-speed mode, the backlash is required for the smooth rotations of the gears and a low gear ratio for the high-speed rotation and the low torque.

As described above, when the main shaft operates in the high-speed mode, the cylinder 211 of the transfer unit 210 operates such that the third, fourth, and fifth gears 230, 240, and 250 coupled to the rotary shaft 220 are positioned between the driving shaft 120 and the output shaft 310 so that the second gear 140 engages with the fourth gear 240 while being in external contact with the fourth gear 240 and the third gear 230 engages with the sixth gear 320 while being in external contact with the sixth gear 320.

When rotational power is transmitted to the driving shaft 120 by the driving unit 110 of the input unit, the rotational power is transmitted to the fourth gear 240 fastened and applied, by the second fastening member 241, to the third gear 230 of the transmission unit 200, through the second gear 140 fastened and coupled to the driving shaft 120 by the first fixing member 141. The fourth gear 240 is coupled to the third gear 230 by the second fastening member 241, such that the rotational force is transmitted to the third gear 230.

Thereafter, the rotary shaft 220 is rotated by the rotation of the fourth gear 240, and the rotational power is transmitted to the third gear 230 and the sixth gear 320 coupled to the output shaft 310 by the third fixing member 321, such that the sixth gear 320 is rotated. In this case, the torque decreases and the rotational speed increases to the extent of the gear ratio.

In addition, since the second gear engages with the fourth gear while being in external contact with the fourth gear and the third gear engages with the sixth gear while being in external contact with the sixth gear, normal backlash is provided, such that no jamming occurs due to a lack of backlash during the rotation. The output shaft 310 fastened and coupled to the sixth gear 320 by the third fixing member 321 is rotated.

An operational principle when the main shaft of the apparatus 1 for operating a main shaft of a machine tool according to the present disclosure operates in the C-axis mode will be described with reference to FIGS. 7 to 10. As illustrated in FIGS. 7 to 10, when the main shaft operates in the C-axis mode, the cylinder 211 of the transfer unit 210 horizontally moves based on an instruction of the PLC or the numerical control unit, such that the third, fourth, and fifth gears 230, 240, and 250 coupled to the rotary shaft 220 are moved to the positions illustrated in FIGS. 7 and 8.

As described above, the C-axis mode (see FIGS. 7 and 8) requires the accurate position control and the very low-speed operation of the main shaft in order to perform machining such as milling, drilling, tapping, or contouring by using the tool post. That is, C-axis division precision is very important when performing 5-axis machining including a forward rotation or a reverse rotation, and a rotational speed is very low in this case. This requirement is implemented by the C-axis mode. In order to perform the precise position control, the C-axis mode requires a state wherein the backlash is minimized and the rotational speed is very low.

When the main shaft operates in the C-axis mode, the cylinder 211 of the transfer unit 210 operates such that the third, fourth, and fifth gears 230, 240, and 250 coupled to the rotary shaft 220 are positioned between the driving shaft 120 and the output shaft 310 so that the second gear 140 engages with the fourth gear 240 while being in external contact with a part of the tooth surface of the fourth gear 240, the first gear 130 engages with the third gear 230 while being in external contact with a part of the tooth surface of the third gear 230, the third gear 230 engages with the sixth gear 320 while a part of the tooth surface of the third gear 230 is in external contact with one side of the tooth surface of the sixth gear 320, and the fourth gear 240 engages with the sixth gear 320 which a part of the tooth surface of the fourth gear 240 is in external contact with the other side of the tooth surface of the sixth gear 320.

When the rotational power is transmitted to the driving shaft 120 by the driving unit 110 of the input unit, the second gear 140 fastened and coupled to the driving shaft 120 by the first fixing member 141 and the first gear 130 fastened to the second gear 140 by the first fastening member 131 are rotated at the same time.

Thereafter, the second gear 140 engages with the fourth gear 240 while being in external contact with a part of the tooth surface of the fourth gear 240, the first gear 130 engages with the third gear 230 while being in external contact with a part of the tooth surface of the third gear 230, the third gear 230 engages with the sixth gear 320 while a part of the tooth surface of the third gear 230 is in external contact with one side of the tooth surface of the sixth gear 320, and the fourth gear 240 engages with the sixth gear 320 which a part of the tooth surface of the fourth gear 240 is in external contact with the other side of the tooth surface of the sixth gear 320, such that the sixth gear 320 is rotated, and finally the output shaft 310 is rotated at a very low speed by the rotation of the sixth gear 320 fastened to the output shaft 310 by the third fixing member 321.

In this case, as illustrated in FIG. 10, the second gear 140 fixed by the first fixing member 141, the third gear 230 fixed by the second fixing member 231, and the sixth gear 320 fixed by the third fixing member 321 shake, in the fixed state, only the first gear 130, fastened and coupled to the first fastening member 131, at alternate angles with respect to the fixed gears (the second gear, the third gear, and the sixth gear), such that the first gear 130 is positioned in a direction opposite to the tooth surface of the opposite gear, thereby reducing the backlash, as illustrated in FIG. 10. Therefore, as illustrated in FIG. 10, the opposite gear is twisted at alternate angles to the extent of the backlash of the gear in a circumferential direction, thereby reducing the backlash.

That is, with respect to the second gear 140 fixed to the driving shaft 120 by the first fixing member 141 and the sixth gear 320 fixed to the output shaft 310 by the third fixing member 321, the fourth gear 240 is adjusted such that the third gear 230 of the rotary shaft 220 is in contact with the tooth surface at one side of the second gear 140 and the tooth surface at one side of the sixth gear 320, and as a result, the sixth gear 320 and the second gear 140 are in contact with the opposite tooth surfaces of the third gear 230. In addition, the first gear 130 is also in contact with the tooth surface of the third gear 230 in a direction opposite to the tooth surface of the second gear 140. As a result, with respect to the sixth gear 320 of the output shaft 310 and the first and second gears 130 and 140 of the driving shaft 120, the third and fourth gears 230 and 240 of the rotary shaft 220 are in contact with one surface of the sixth gear 320, the third gear 230 is in contact with the first gear 130, and the fourth gear 240 is in contact with the second gear, such that a divided gear structure is implemented. As a result, it is possible to perform the super-low-speed operation while minimizing the backlash.

Each of the first, second, third, fourth, fifth, sixth, and seventh gears 130, 140, 230, 240, 250, 320, and 330 may be configured as, but not necessarily limited to, a spur gear.

Therefore, according to the apparatus for operating a main shaft of a machine tool according to the present disclosure, the single main shaft of the multi-tasking machining center performs all of the high-speed mode, the low-speed mode, and the C-axis mode while maintaining or eliminating the backlash as necessary by the change in arrangement of the engagement of the first, second, third, fourth, fifth, sixth, and seventh gears between the input unit, the transmission unit, and the output unit in accordance with the rectilinear reciprocation of the transmission unit, and as a result, it is possible to reduce manufacturing costs, improve stability and reliability of the machine tool, implement the compact machine tool by miniaturizing the apparatus, improve productivity by reducing the time taken to readjust the backlash, prevent thermal deformation caused by heat generated by the backlash in order to improve machining precision, improve rigidity and durability through a simple shaft arrangement and a simple gear operating method, and improve a consumer's satisfaction.

While the present disclosure has been described above with reference to the exemplary embodiments of the present disclosure in the detailed description of the present disclosure, it may be understood, by those skilled in the art or those of ordinary skill in the art, that the present disclosure may be variously modified and changed without departing from the spirit and scope of the present disclosure disclosed in the claims. Accordingly, the technical scope of the present disclosure should not be limited to the contents disclosed in the detailed description of the specification but should be defined only by the claims.

The invention claimed is:

1. An apparatus for operating a main shaft of a machine tool, the apparatus comprising:
   an input unit configured to transmit power for operating the main shaft;
   an output unit disposed in parallel with the input unit and configured to operate the main shaft with the power from the input unit; and
   a transmission unit disposed in parallel with the input unit and the output unit so as to be capable of rectilinearly reciprocating between the input unit and the output unit and configured to transmit the power from the input unit to the output unit,
   wherein,
   the main shaft is capable of operating in a high-speed mode, a low-speed mode, and a C-axis mode in accordance with the rectilinear reciprocation of the transmission unit,
   the input unit and the transmission unit operate at the same time by gear engagement, and the transmission unit and the output unit operate at the same time by gear engagement, and
   a rectilinear reciprocation distance of the transmission unit is changed in accordance with the high-speed mode, the low-speed mode, or the C-axis mode of the main shaft, and the arrangement of the gear engagement between the transmission unit and the input unit and the arrangement of the gear engagement between the transmission unit and the output unit are changed in accordance with the change in rectilinear reciprocation distance of the transmission unit.

2. The apparatus of claim 1, further comprising:
   a housing unit configured to partially or entirely cover the input unit, the output unit, and the transmission unit.

3. The apparatus of claim 1, wherein the input unit comprises:
   a driving unit configured to create power for operating the main shaft;
   a driving shaft rotatably installed at one side of the driving unit and configured to be rotated by the driving power from the driving unit;
   a first gear installed on the driving shaft; and
   a second gear installed on the driving shaft so as to be spaced apart from the first gear in a horizontal direction of the driving shaft.

4. The apparatus of claim 3, wherein the second gear is installed to be coupled to the driving shaft by means of a first fixing member, and the first gear is installed to be coupled to the second gear by means of a first fastening member.

5. The apparatus of claim 3, wherein the input unit further comprises a first bearing installed at one end or both ends of the driving shaft in order to support the driving shaft.

6. The apparatus of claim 3, wherein the output unit comprises:
   an output shaft rotatably installed in parallel with the driving shaft;
   a sixth gear installed on the output shaft; and
   a seventh gear installed on the output shaft so as to be spaced apart from the sixth gear in the horizontal direction of the output shaft.

7. The apparatus of claim 6, wherein the sixth gear is installed to be coupled to the output shaft by means of a third fixing member, and the seventh gear is installed to be coupled to the output shaft by means of a fourth fixing member.

8. The apparatus of claim 6, wherein the transmission unit comprises:
   a transfer unit configured to rectilinearly reciprocate the transmission unit between the driving shaft and the output shaft;
   a rotary shaft rotatably installed at one side of the transfer unit;
   a fifth gear installed on the rotary shaft;
   a third gear installed on the fifth gear so as to be spaced apart from the fifth gear in the horizontal direction of the rotary shaft; and
   a fourth gear installed on the fifth gear such that the fourth gear faces the third gear so as to be in parallel with the third gear and is spaced apart from the third gear in the horizontal direction of the rotary shaft.

9. The apparatus of claim 8, wherein the third gear is installed to be coupled to the fifth gear by means of a second fixing member, the fourth gear is installed to be coupled to the third gear by means of a second fastening member, and the fifth gear is coupled to the rotary shaft by spline engagement.

10. The apparatus of claim 8, wherein the transfer unit of the transmission unit comprises:
    a cylinder configured to rectilinearly reciprocate the rotary shaft between the driving shaft and the output shaft; and
    a connecting bracket installed at a tip of the cylinder and installed to be connected to the rotary shaft.

11. The apparatus of claim 8, further comprising:
    second and third bearings installed at both ends of the rotary shaft in order to support the rotary shaft.

12. The apparatus of claim 8, wherein when the main shaft operates in the low-speed mode, the transfer unit operates such that the rotary shaft is positioned between the driving shaft and the output shaft so that the second gear engages with the third gear while being in external contact with the third gear and the fifth gear engages with the seventh gear while being in external contact with the seventh gear.

13. The apparatus of claim 8, wherein when the main shaft operates in the high-speed mode, the transfer unit operates such that the rotary shaft is positioned between the driving shaft and the output shaft so that the second gear engages with the fourth gear while being in external contact with the fourth gear and the third gear engages with the sixth gear while being in external contact with the sixth gear.

14. The apparatus of claim 8, wherein when the main shaft operates in the C-axis mode, the transfer unit operates such that the rotary shaft is positioned between the driving shaft and the output shaft so that the second gear engages with the fourth gear while being in external contact with a part of a tooth surface of the fourth gear, the first gear engages with the third gear while being in external contact with a part of a tooth surface of the third gear, the third gear engages with the sixth gear while a part of the tooth surface of the third gear is in external contact with one side of a tooth surface of the sixth gear, and the fourth gear engages with the sixth gear while a part of the tooth surface of the fourth gear is in external contact with the other side of the tooth surface of the sixth gear.

15. The apparatus of claim 12, wherein a horizontal length of the second gear is larger than a horizontal length of the first gear.

16. The apparatus of claim 12, wherein a diameter of the seventh gear is larger than a diameter of the sixth gear.

17. The apparatus of claim 12, wherein a diameter of the third gear and a diameter of the fourth gear are equal to each other, and the diameter of the third gear and the diameter of the fourth gear are larger than a diameter of the fifth gear.

18. The apparatus of claim 12, wherein each of the first, second, third, fourth, fifth, sixth, and seventh gears is a spur gear.

* * * * *